United States Patent
Monastyrskyy et al.

(10) Patent No.: US 10,751,611 B2
(45) Date of Patent: Aug. 25, 2020

(54) USING A GAME CONTROLLER AS A MOUSE OR GAMEPAD

(71) Applicant: Microsoft Technology Licensing, LLC, Redmond, WA (US)

(72) Inventors: Oleksandr Monastyrskyy, Bellevue, WA (US); Chinweizu Uzodinma Owunwanne, Renton, WA (US); Anders Edgar Klemets, Redmond, WA (US); Matthew Bruce Andrews, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 15/878,052

(22) Filed: Jan. 23, 2018

(65) Prior Publication Data

US 2019/0126141 A1    May 2, 2019

Related U.S. Application Data

(60) Provisional application No. 62/579,557, filed on Oct. 31, 2017.

(51) Int. Cl.
*A63F 13/20* (2014.01)
*A63F 13/235* (2014.01)
(Continued)

(52) U.S. Cl.
CPC ............ *A63F 13/235* (2014.09); *A63F 13/20* (2014.09); *A63F 13/22* (2014.09); *A63F 13/42* (2014.09);
(Continued)

(58) Field of Classification Search
CPC .......... A63F 13/20; A63F 13/22; A63F 13/40; A63F 13/42
See application file for complete search history.

(56) References Cited

U.S. PATENT DOCUMENTS 9,517,408 B2   12/2016  Jaouen et al.
9,566,512 B2   2/2017   Schantz et al.
(Continued)

OTHER PUBLICATIONS

"Control your PC using a gamepad or joystick", Retrieved From <<http://keysticks.net/site/>>, Retrieved on: Nov. 30, 2017, 3 Pages.
(Continued)

*Primary Examiner* — James S. McClellan
(74) *Attorney, Agent, or Firm* — Arent Fox LLP

(57) ABSTRACT

The present disclosure generally relates to game consoles including game controllers and connected to one or more computing device. Specifically, a game console may receive, via a game controller, a first input triggering an activation of a multi-mode controller switching application at the game console. Further, while a multi-mode controller switching application is active and the game controller is operating in the first controller mode, the game console may receive, via the controller, a second input representing a selection of the second controller mode different from the first controller mode, switch from the first controller mode to the second controller mode in response to receiving the second input, and controlling the computing device in communication with the game console in accordance with the second controller mode.

20 Claims, 5 Drawing Sheets

(51) Int. Cl.
   *A63F 13/42*    (2014.01)
   *G06F 3/0354*   (2013.01)
   *G06F 3/02*     (2006.01)
   *A63F 13/22*    (2014.01)
   *A63F 13/40*    (2014.01)

(52) U.S. Cl.
   CPC ............ G06F 3/02 (2013.01); G06F 3/03543 (2013.01); *A63F 13/40* (2014.09)

(56) References Cited

U.S. PATENT DOCUMENTS

| | | |
|---|---|---|
| 2004/0259638 A1 | 12/2004 | Kramer et al. |
| 2005/0239524 A1* | 10/2005 | Longman .............. G06F 3/0219 463/9 |
| 2009/0213081 A1 | 8/2009 | Case, Jr. |
| 2013/0303281 A1* | 11/2013 | Argiro ................... A63F 13/02 463/31 |
| 2015/0105152 A1 | 4/2015 | Bellinghausen et al. |

OTHER PUBLICATIONS

"Controller Companion", Retrieved From <<https://www.youtube.com/watch?v=kRkHe5H_tPc>>, Sep. 14, 2015, 3 Pages.

Hunt, Cale, "How to use Xbox One controller as a mouse to control your Windows 10 PC", Retrieved From <<https://www.windowscentral.com/how-use-xbox-one-controller-mouse-control-your-windows-10-pc>>, Jul. 13, 2016, 13 Pages.

"International Search Report and Written Opinion Issued in PCT Application No. PCT/US18/057192", dated Feb. 1, 2019, 14 Pages.

* cited by examiner

USING A GAME CONTROLLER AS A MOUSE OR GAMEPAD

RELATED APPLICATION(S)

This application claims the benefit of U.S. Provisional Application Ser. No. 62/579,557, entitled "USING A GAME CONTROLLER AS A MOUSE OR GAMEPAD" and filed on Oct. 31, 2017, which is expressly incorporated by reference herein in its entirety.

BACKGROUND

The present disclosure relates to a peripherals for controlling games, and more particularly, to a game controller that can be utilized as a mouse or gamepad for a computing device connected to a game console.

Game controllers may facilitate user interaction with video games via a game console. Game controllers may come in many shapes, sizes, and configurations depending upon the desired gaming environment in which the controllers are to be used. There may be multi-purpose controllers that have one or more multi-function actuators for controlling a wide range of games. There may also be specialty controllers designed for specific genre of games, such as steering wheels for racing games, weapons for shooting games, and navigation sticks for aviation games.

Game controllers may often be designed to operate with one corresponding host gaming system. Some controllers may be designed for use with personal computers, while others may be dedicated to various types of console-based systems, such as the Xbox® video game system from Microsoft Corporation. Further, gaming systems have evolved from those that provided an isolated gaming experience to networked systems providing a rich, interactive experience that may be shared in real time between friends and other gamers.

Such gaming systems or environments may include not only a game console, but also one or more devices such as personal computers and/or displays (including televisions) connected to or in communication with the game console via a network connection. The one or more devices may provide additional functionality and enhanced user experience by permitting access to content and/or software on the one or more devices via the game console and using the game controller. However, the game controller may be limited in controlling some devices such as personal computers.

Thus, there is a need in the art for improvements in game controller functionality.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure provides a method for communication at a game console including a game controller. The method may include receiving, via the game controller, a first input triggering an activation of a multi-mode controller switching application at the game console, the multi-mode controller switching application is configured to transmit one or more commands received from the game controller according to a first controller mode or a second controller mode to a computing device in communication with the game console. The method may further include, while the multi-mode controller switching application is active and the game controller is operating in the first controller mode, receiving, via the controller, a second input representing a selection of the second controller mode different from the first controller mode, switching from the first controller mode to the second controller mode in response to receiving the second input, and controlling the computing device in communication with the game console in accordance with the second controller mode.

The present disclosure also provides a game console comprising a memory configured to store one or more executable instructions, a game controller configured to transmit one or more received inputs, and at least one processor in communication with the memory and the game controller. The at least one processor may be configured to receive, via a game controller, a first input triggering an activation of a multi-mode controller switching component at the game console. The at least one processor may further be configured to receive, via the game controller, a first input triggering an activation of a multi-mode controller switching application at the game console, wherein the multi-mode controller switching application is configured to transmit one or more commands received from the game controller according to a first controller mode or a second controller mode to a computing device in communication with the game console. The at least one processor may further be configured to, while the multi-mode controller switching application is active and the game controller is operating in the first controller mode, receive, via the controller, a second input representing a selection of the second controller mode different from the first controller mode, switch from the first controller mode to the second controller mode in response to receiving the second input, and control the computing device in communication with the game console in accordance with the second controller mode.

The present disclosure further provides a computer-readable medium storing instructions executable by a game console including a game controller, comprising at least one instruction for receiving, via the game controller, a first input triggering an activation of a multi-mode controller switching application at the game console, wherein the multi-mode controller switching application is configured to transmit one or more commands received from the game controller according to a first controller mode or a second controller mode to a computing device in communication with the game console. The computer-readable medium may further comprise code for, while the multi-mode controller switching application is active and the game controller is operating in the first controller mode receiving, via the controller, a second input representing a selection of the second controller mode different from the first controller mode, switching from the first controller mode to the second controller mode in response to receiving the second input, and controlling the computing device in communication with the game console in accordance with the second controller mode.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The present disclosure will be better understood from the following detailed description read in light of the accompanying drawings, wherein like reference numerals are used to designate like parts in the accompanying description.

DETAILED DESCRIPTION

Figure 1:
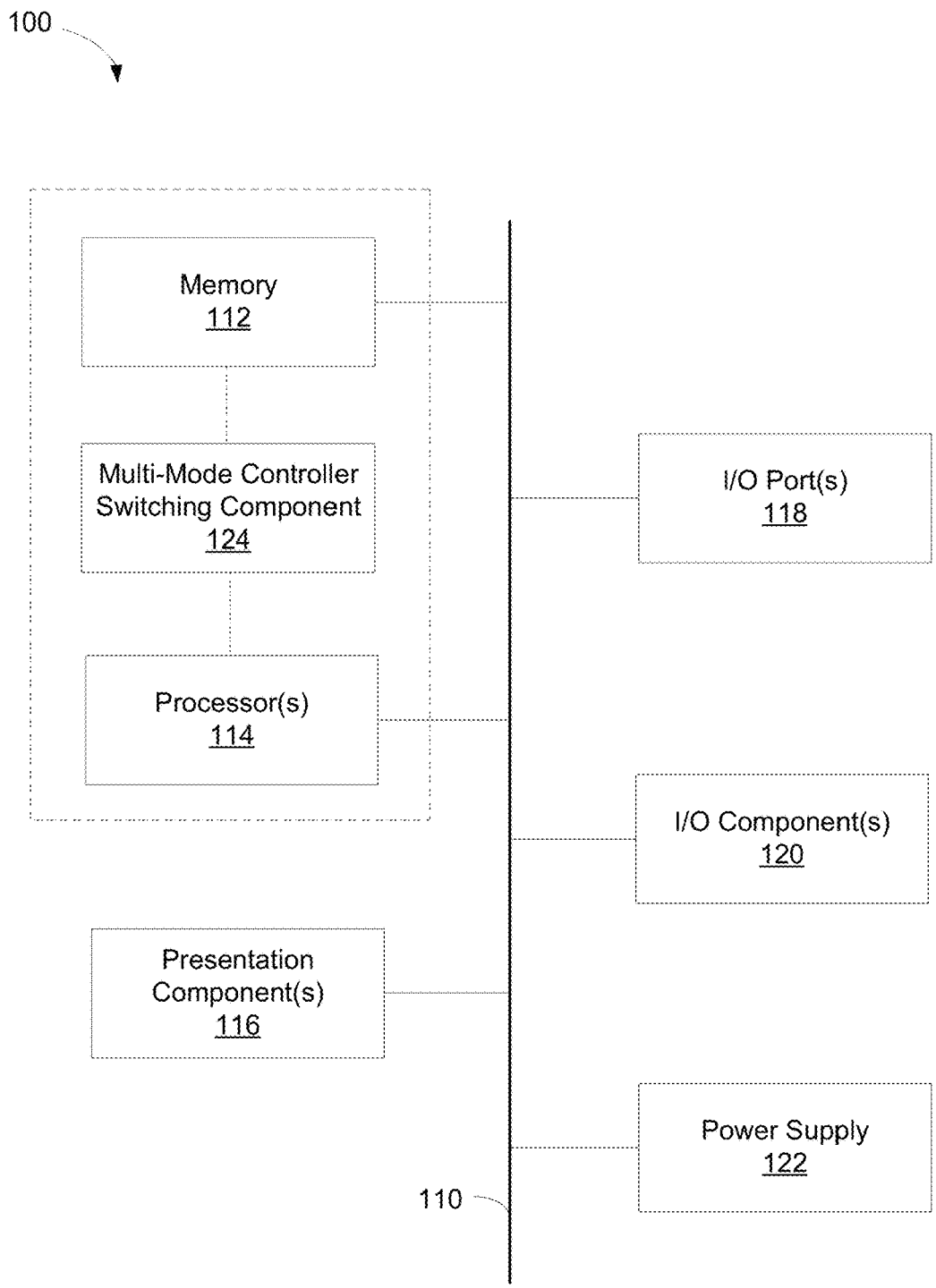
FIG. 1 is a block diagram of an example computing environment including the controller switching component, which may include a multi-mode controller switching application in accordance with an implementation of the present disclosure.

The present disclosure relates to a game console having a multi-mode controller switching component configured for switching a game controller between two controller modes that allow use of the game controller as either a gamepad in one mode or a keyboard/mouse in another mode for controlling a computing device connected to a game console. For example, gaming environments have evolved to include multiple devices connected to a game console as part of a gaming system. Specifically, game consoles may not only be connected to an audio/video output device such a display or television, but also to other computing devices such as personal computers (e.g., laptops), tablets, and/or smartphones. In fact, connection between the game console and other computing devices may be performed in a remote manner such that the game console may access content or data at the computing devices over a network connection (e.g., via the Internet, a local area network, or a home network). Typically, the game console may include a game controller having functionality mapped to using the game console. As such, the game controller, while in a controller mode configured for the game console, may be limited in interacting with a computing device such as a personal computer that is remotely connected to the game console. Such limited game controller configuration may inhibit efficient control of the remote computing device, or in some cases, may prevent control entirely (e.g., due to the remote computing device requiring input from a different controller mode), thereby reducing the overall user experience.

As such, it may be desirable to provide a game controller that may be utilized as and dynamically switched between either a gamepad mode or a keyboard/mouse mode, e.g., via the multi-mode controller switching component, for providing game-related or keyboard/mouse related inputs to a remote computer device that is connected to the game console via a communication network. The switching between keyboard/mouse and gamepad modes may occur dynamically based on a user's preference in response to a received user input (such as by detecting the user pressing a specific key combination, e.g., menu and view, receiving a voice command, or detecting a gesture). The multi-mode controller switching component may allow a user the flexibility to go back and forth between keyboard/mouse or gamepad modes depending on a user selection of one or more buttons of the game controller, thereby enabling different types of inputs to be supplied to control the remote computer device.

Specifically, the present implementations may receive, via a game controller, a first input triggering an activation of a multi-mode controller switching component at a game console. The present implementations may also, while the multi-mode controller switching component is activated and the game controller is operating in the first controller mode, receive a second input representing a selection of a second controller mode different from the first controller mode. The present implementations further switch from the first controller mode to the second controller mode in response to receiving the second input. The present implementations further control a computing device in communication with the game console in accordance with the second controller mode. In an example scenario, for instance, the first controller mode of the game controller is a gamepad mode for operating a first application executing on the computer device and being cast to the game console, while the second controller mode is a keyboard/mouse mode for controlling the first application or a second application executing on the computing device. Thus, the present disclosure enables controlling of a remote computer device using a gamepad controller connected to a game console in at least one of two controller modes.

Referring now to FIG. 1, an example operating environment for implementing various embodiments of the present disclosure is shown and designated generally as computing device 100, which includes a multi-mode controller switching component 124 that enables controlling a remote computer device with gamepad inputs or with keyboard/mouse inputs using a multi-mode gamepad controller connected to the computer device 100 (e.g., a game console). The multi-mode controller switching component 124 may be implemented, for example, as software or computer-readable code or instructions executable by a processor, or as specially-coded hardware, or as some combination of both (e.g., firmware). For example, the multi-mode controller switching component 124 may include or otherwise correspond to an application program residing at the computer device 100. Computing device 100 may be but one example of a suitable computing environment and is not intended to suggest any limitation as to the scope of use or functionality of the present disclosure. Neither should the computing device 100 be interpreted as having any dependency or requirement relating to any one or combination of components illustrated. In some implementations, the computing device 100 may be a video game console.

The present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. One or more implementations may be practiced in a variety of system configurations, including handheld devices, consumer electronics, general-purpose computers, specialty computing devices, etc. Various implementations may also be practiced in distributed computing environments where tasks are performed by remote-processing devices that are linked through a communications network.

Computing device 100 may include a bus 110 that directly or indirectly couples the following devices: memory 112, one or more processors 114, one or more presentation components 116 (e.g., a display, a television), input/output (I/O) ports 118, I/O components 120, a power supply 122, and a multi-mode controller switching component 124, which may be configured to switch between a first controller mode providing gamepad inputs for controlling content on a game console and/or content being cast from a remotely-located, networked computer device to the game console, and a second controller mode providing keyboard/mouse inputs for controlling the remotely-located, networked computing device in communication with the game console. Bus 110 may represent one or more busses (such as an address bus, data bus, or combination thereof). Although the various blocks of FIG. 1 are shown with lines for the sake of clarity, in reality, delineating various components is not so clear, and metaphorically, the lines may more accurately be grey and fuzzy. For example, one may consider a presentation component 116 such as a display device to be an I/O component 120. Also, the one or more processors 114 may include additional memory. The diagram of FIG. 1 is merely illustrative of an example computing device that may be used in connection with one or more implementations of the present disclosure. Distinction may not be made between such categories as "workstation," "server," "laptop," "handheld device," etc., as all may be contemplated within the scope of FIG. 1 and refer to "computer" or "computing device."

Computing device 100 may include a variety of computer-readable media. Computer-readable media may be any available media that can be accessed by computing device 100 and includes both volatile and nonvolatile media, removable and non-removable media. By way of example, and not limitation, computer-readable media may comprise computer storage media and communication media. Computer storage media may include both volatile and nonvolatile, removable and non-removable media implemented in any method or technology for storage of information such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Combinations of the above may also be included within the scope of computer-readable media. Computer storage media may not include a propagated data signal.

Memory 112 may include computer-storage media in the form of volatile and/or nonvolatile memory. The memory 112 may be removable, non-removable, or a combination thereof. Example memory may include solid-state memory, hard drives, optical-disc drives, etc. Computing device 100 may include one or more processors 114 that read data from various entities such as bus 110, memory 112 or I/O components 120. Presentation component(s) 116 may present data indications (e.g., visual, audio, haptic) to a user or other device. Example presentation components 116 may include a display device, a television, a speaker, a printing component, a vibrating component, etc. I/O ports 118 may allow computing device 100 to be logically coupled to other devices including I/O components 120, some of which may be built in. Illustrative I/O components 120 may include a microphone, joystick, game controller or pad, satellite dish, scanner, printer, wireless device, etc.

The one or more processors 114 may include a CPU may include one or more processors for executing instructions. An example of CPU can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. Further, the operating system may include instructions (such as one or more applications) stored in memory and executed by the CPU. The computing device 100 may also include an application including instructions stored in memory and executed by the CPU.

Figure 2:
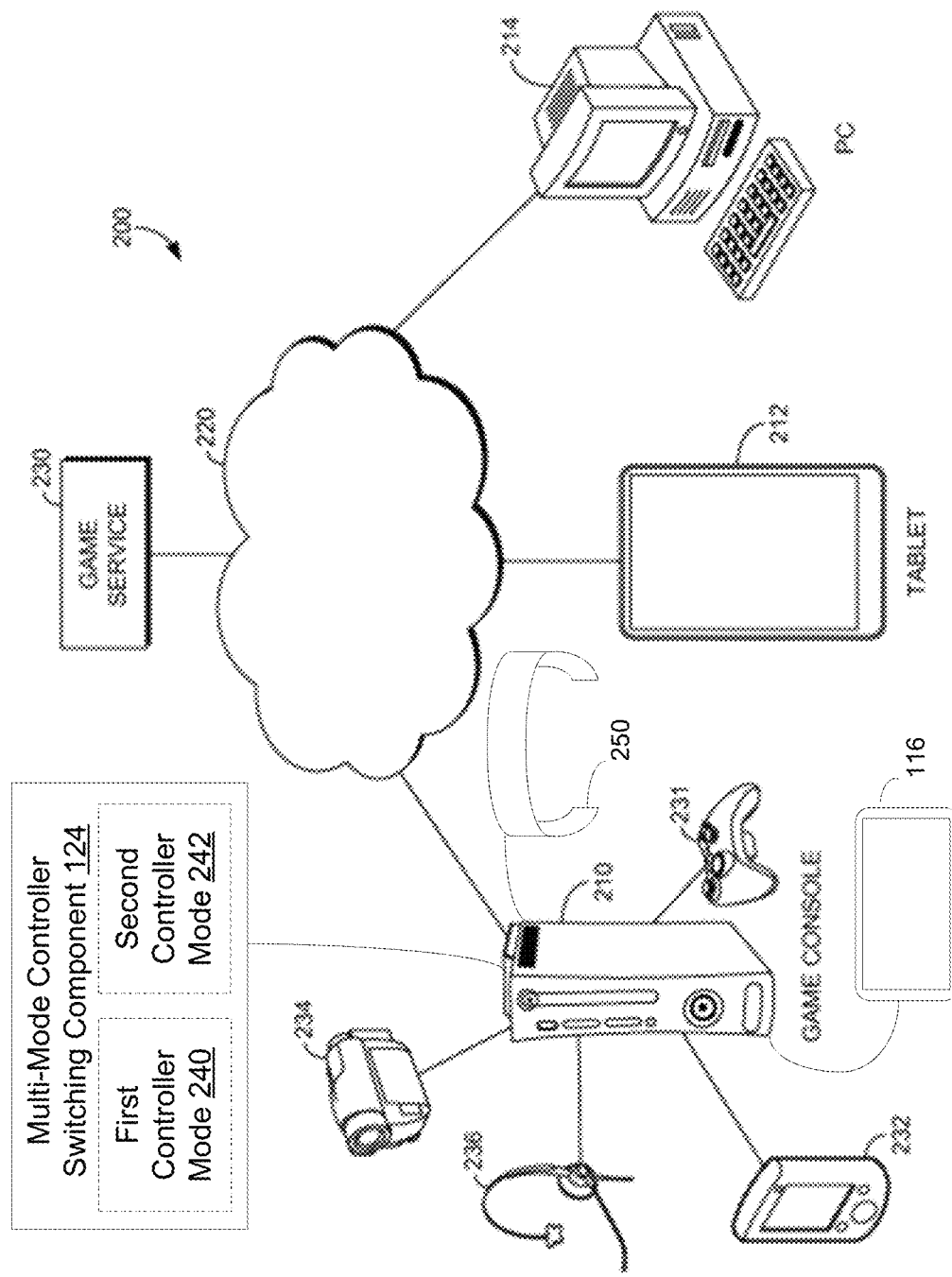
FIG. 2 is a diagram of a network gaming environment having at least a video game console including the multi-mode controller switching component in accordance with an implementation of the present disclosure.

Referring now to FIG. 2, network gaming environment 200 is shown, in accordance with some implementations of the present disclosure. The online gaming environment 200 may include various game clients connected through a network 220 to a game service 230. Example game clients may include a game console 210, a tablet 212, and/or a personal computer 214. Use of other game clients, such as smart phones, may also possible. The game console 210 may include multi-mode controller switching component 124, and may have one or more game controllers including game controller 231 communicatively coupled. The multi-mode controller switching component 124 may be configured to switch between a first controller mode 240 providing gamepad inputs for controlling the game console 210 or a computing device such as personal computer 214 that is executing an application and casting the content to the game console 210, and a second controller mode 242 providing keyboard/mouse inputs for controlling a computing device such as personal computer 214. In some implementations, the game console 210, or game console 210 and game controller 231, may be the same as computing device 100. In one implementation, the tablet 212 may be a different form of the game controller 231 and act as an input device for a game console 210 or a personal computer 214. In another embodiment, the tablet 212 is a stand-alone game client. Network 220 may be a wide area network, such as the Internet, or a local area network (LAN).

The game console 210 may connect to one or more presentation components 116, such as a television or other display) via A/V interfacing cables. A power cable may provide power to the game console 210. The game console 210 may be further equipped with internal or externally added network capabilities, such as, but not limited to a cable or modem connector to facilitate access to the network 220. A memory unit may be inserted into the game controller 231 to provide additional and portable storage or alternatively into the game console 210. Portable memory units enable users to store game parameters and transport them for play on other consoles.

The one or more controllers associated with game console 210 may include, but are not limited to, game controller 231, tablet 232, headset 236, virtual reality device 250, and depth camera 234. The headset 236, may capture audio input from a player and the player's surroundings and may also act as an output device if it is coupled with a headphone or other speaker. The virtual reality device 250 may be a head mounted device (HMD) for use with virtual reality and/or augmented reality applications.

The depth camera 234 may generate a depth cloud used as an input. The depth camera 234 may an use infrared camera to determine a depth, or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Game service 230 may include multiple computing devices communicatively coupled to each other. In one implementation, the game service 230 is implemented using one or more server farms. The server farms may be spread out across various geographic regions including cities throughout the world. In this scenario, the game clients may connect to the closest server farms. Embodiments of the present invention are not limited to this setup.

The game controller 231 in combination with the multi-mode switching component 124 in the first controller mode 240 for providing gamepad inputs may be capable of generating control signals, such as those generated by button selections and joystick movement. Movement data such as that generated by accelerometers and gyros within the game pad 231 may be examples of sensor data. The game controller 210 can be coupled to the game console 210 via a wired or wireless interface. In wired operation, the controller 231 may be connected to the game console 231 via a cable. While connected, the game controller 231 may derive power from the game console 210 through the cable. In wireless operation, the game controller 231 may be connected to the game console 210 via a wireless link and draws from its own power source, such as a battery. The wireless link may be implemented using any one of many different technologies including, for example, infrared, Bluetooth, or RF technologies. The cable may be optionally detached from the controller to offer more freedom of movement.

The game controller 231 may be equipped with any of a wide variety of user interaction mechanisms. For example, the game controller 231 may be equipped with at least two thumbsticks, a directional or D-pad, surface buttons, and at least two triggers. These mechanisms are merely representative, and other gaming mechanisms (e.g., shoulder trigger buttons) may be substituted for and/or added to the game controller 231.

The game controller 231 in combination with the multi-mode switching component 124 in the second controller mode 242 for providing keyboard/mouse inputs may be capable of generating control signals, such as those generated by button selections and joystick movement each mapped to, for example, one of movement of a mouse cursor, a left mouse button click, or right mouse button click.

Thus, based on dynamically switching between the first controller mode 240 and the second controller mode 242, the game controller 231 may communicate with the game console 210 to provide gamepad or keyboard/mouse inputs over the network 220 to the computer device 214 to control operation of an application executing on the computer device 214 and being cast to the game console 210.

Figure 3:
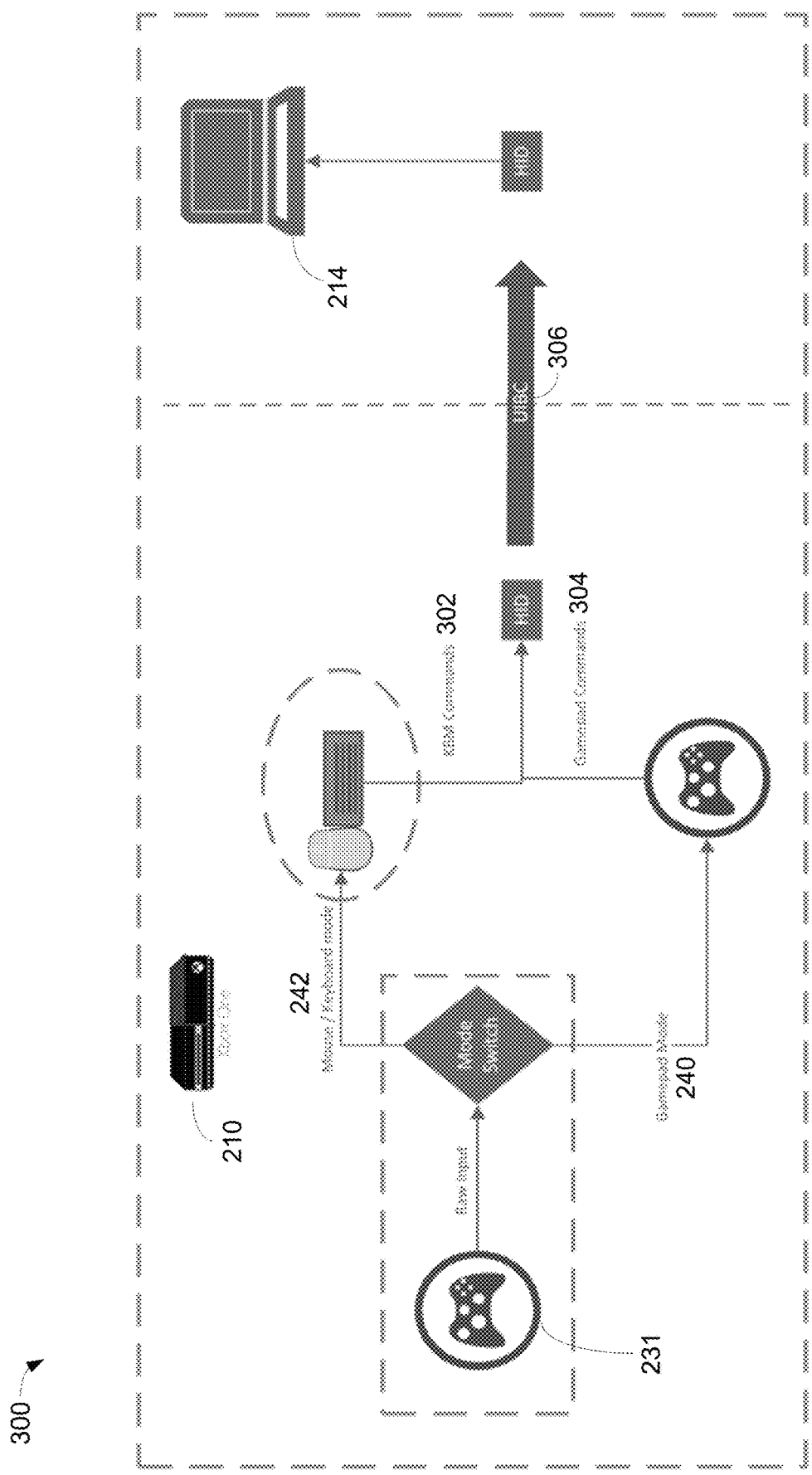
FIG. 3 is a diagram of a multi-mode controller switching scheme in accordance with an implementation of the present disclosure.

Referring now to FIG. 3, a multi-mode controller switching scheme 300 may be operated by the game controller 231 and the game console 210 to control the game console 210 and/or the personal computer 214. For example, content casting technology may allow a user to cast content from one device to another. In some examples, the casted to device may include a larger display device, such as a television or projector.

In some implementations, casting may permit an application that is running on a first device (e.g., personal computer 214) to generate images, video, or graphics, and make those appear on a second device (e.g., presentation components 114 via game console 210). The images, video, or graphics may be transmitted wirelessly from the first device to the second device, but can also be transmitted by means of a wired connection, such as an high definition multimedia interface (HDMI) cable. In some implementations, content may be casted according to a Wi-Fi display protocol referred to as Miracast as a wireless connection technology between the first and second devices.

However, when using casting technology at the personal computer 214, where the personal computer 214 may be referred to the source device, a sink device such as the game console 210 including the game controller 231 may be limited in controlling the personal computer 214 when in a first controller mode 240. That is, when casting to the game console 210 from a remote computing device such as personal computer 214, controlling the personal computer 214 in an efficient manner equivalent to using a keyboard/mouse may be limited when in the first controller mode 242. In fact, when a multi-mode controller switching component 124 is deactivated, the game console 210 may receive and interpret inputs from the game controller 231, e.g., gamepad inputs, as configured for interaction with content at the game console 210. In other words, for example, the game controller 231 may act to control a game being executed by the game console 210 by sending inputs to the game console 210. As such, in prior solutions, even if the personal computer 214 is connected to the game console 210, a user may keep the personal computer 214 in close proximity to use associated input methods such as touch, mouse, keyboard, etc., to supplement the game inputs provided by the game controller 231. Such limited potential configuration may result in a less compelling user experience unless the projected content lacks interactivity. However, if projecting, accessing, and/or controlling interactive content, notably from a device that is remote from the game console 210, it may be beneficial to control the source device (e.g., personal computer 214) via the sink device (e.g., game console 210) without sacrificing user operability in terms of controlling the sink device.

As such, the multi-mode controller switching scheme 300 may include a multi-mode controller switching component 124 residing at the game console configured to provide controlling of the remote personal computer 214 and, for example, a game executed by the remote personal computer 214 being casted to the game console 210, using the game controller 231 connected to the game console 210. In some implementations, the multi-mode controller switching component 124 may permit or otherwise enable control of the personal computer 214 in communication with the game console 210 via the game controller 231 according to the first controller mode 240 or the second controller mode 242. In some implementations, controlling may include being able to dynamically change an input between the first controller mode 240 corresponding to a gamepad mode, e.g., a gamepad input, and the second controller mode 242 corresponding to a keyboard/mouse mode, e.g., a keyboard/mouse input, to control the remote personal computer 214 and, for example, a game or other software executed by the remote personal computer 214 being casted to the game console 210, in an efficient manner based on whether a user is trying to access content or features of the game console 210 or the personal computer 214 and/or if a game being executed by the personal computer 214 and casted to the game console 210 has opportunities to provide mouse inputs as opposed to gaming inputs. Such implementation provides the user full control, in different modes, over devices connected to or in communication with the game console 210.

In an example, a user may use the game controller 231 to control the game console 210 using gamepad keys/buttons/sticks. For example, while in the first controller mode 240, an input may be received from the game controller 231 at the game console 210. The input may be interpreted as gamepad commands 304 for interacting with content at the game console 210. However, in some implementations, a user may wish to interact with the personal computer 214 in an efficient manner. So, the user may trigger an activation of the multi-mode controller switching component 124 via any one or any combination of buttons of the game controller 231 so as to control the personal computer 214 via the game console 210 in either the first controller mode 240 or the second controller mode 242.

Specifically, when the multi-mode controller switching component 124 is activated, inputs received at the game controller 231 may be translated to commands and subsequently routed to the personal computer 214 via the game console 210. Accordingly, the multi-mode controller switching component 124 configures the game console 210 to route game controller 210 inputs as commands to the personal computer 214 according to the first controller mode 240, e.g., gaming inputs, or the second controller mode 242, e.g., keyboard/mouse inputs. Further, while the multi-mode controller switching component 124 is activated, the game controller 231 and/or game console 210 may receive a user input, e.g., a detected specific button/key combination that triggers a switch from one controller mode to another controller mode. In some implementations, the user input that triggers the switch may also be based on a voice input, a detected physical gesture or swipe or gesture received on a display, or may be a dedicated button or switch on the game controller 231, game console 210, and/or another device connected to the game console 210 (e.g., using an app on a nearby smartphone). Specifically, the game console 210 may receive the input (button/key combo, voice, etc.), and may determine whether the received input corresponds to a defined input (e.g., sequential or simultaneous combination of key input) for triggering a controller mode adjustment. The forgoing may be performed while the multi-mode controller switching component 124 is activated and the game console 210 is connected to and/or in communication with the personal computer 214 via a wired or wireless interface.

The multi-mode controller switching component 124 may then switch from one controller mode to another controller mode in response to receiving the input. For example, the multi-mode controller switching component 124 activated on the game console 210 may switch from the first controller mode 242 to the second controller mode 240 based on determining that the received input corresponds to a defined input that triggers the controller mode switching. In doing so, the user may use the game controller 231 as a keyboard/mouse in controlling the personal computer 214. For instance, the game console 210 may receive inputs from the game controller 231 which, during the second controller mode 242, may correspond to keyboard/mouse commands 302 to control operation of an application executing on the personal computer 214. Alternatively, for instance, the game console 210 may receive inputs from the game controller 231 which, during operation of the multi-mode controller switching component 124 in the first controller mode 240, may correspond to gamepad commands 304 to control operation of an application executing on the personal computer 214. It should be noted that the gamepad commands 304 and the keyboard/mouse commands 302 may be used to control the same application, or different applications, operating on the personal computer 214. Using a human interface device, and according to a user interface back channel (UIBC) protocol, the commands may be transmitted to the personal computer 214.

Figure 4A:
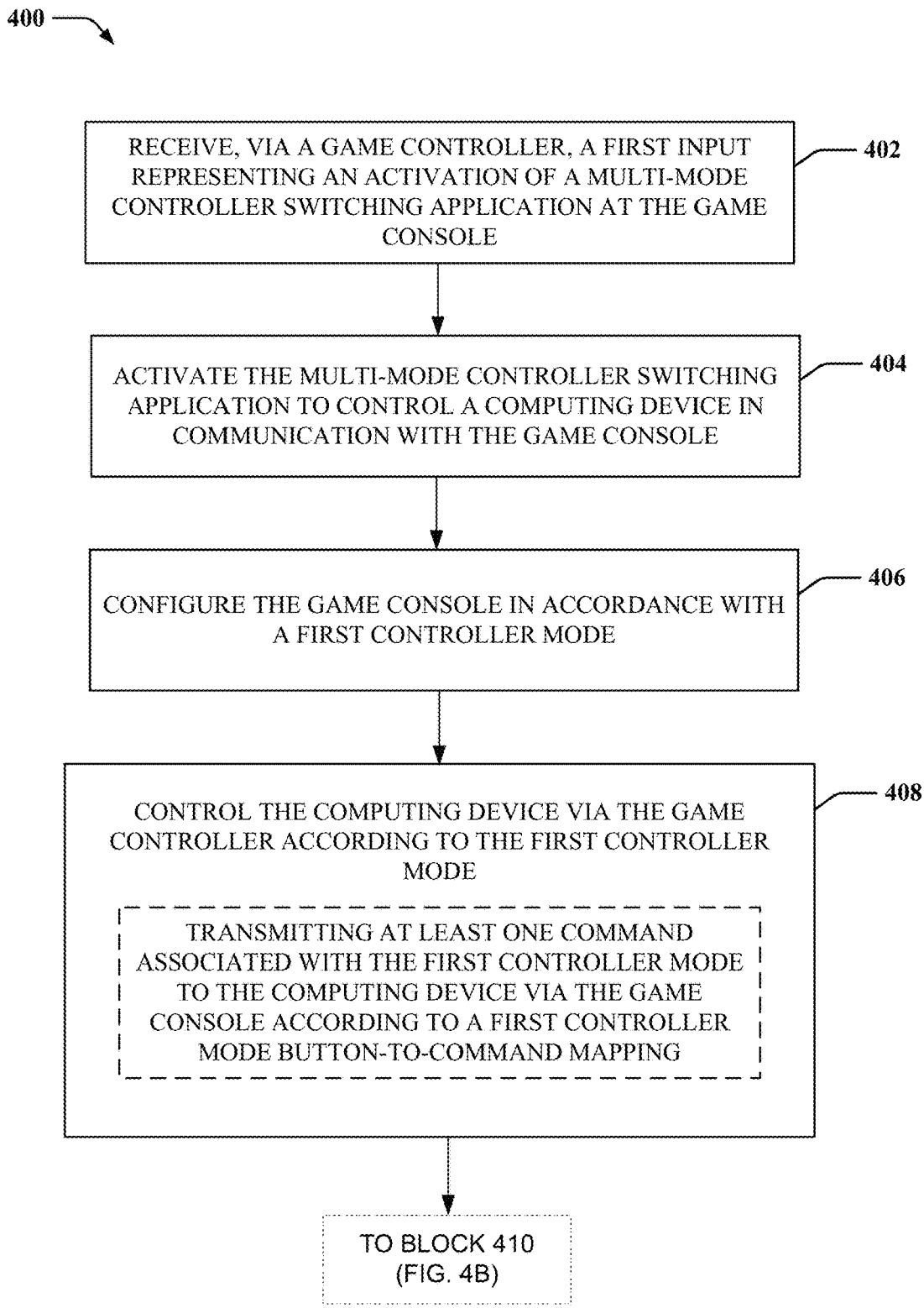
FIGS. 4A and 4B are flow charts of a method of switching between game controller modes in accordance with an implementation of the present disclosure.
Figure 4B:
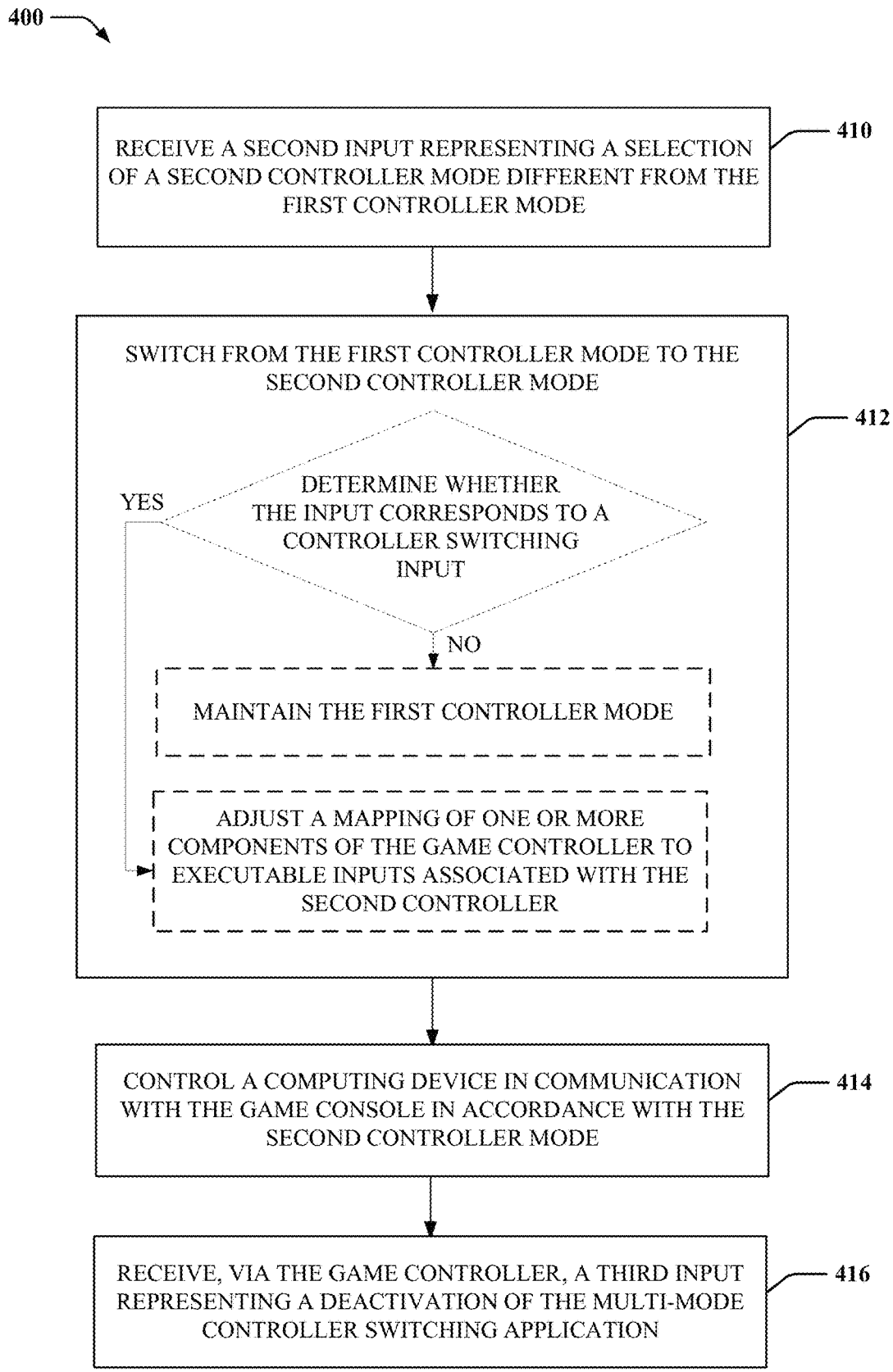

Referring now to FIG. 4, an example method 400 provides for controlling a computing device such as the personal computer 214 in communication with the game console 210 using the game controller 231 in at least one of a first controller mode 240 or a second controller mode 242. The actions illustrated in method 400 may overlap in time. For example, at an instant in time, two of the actions may be performed by different components. The execution of the actions may also be interleaved on a component. Additionally, the actions illustrated in method 400 may be performed in an order other than illustrated in FIG. 4.

At block 402, the method 400 may receive, via the game controller 231, a first input representing an activation of a multi-mode controller switching application at the game console. For example, as described herein, the game console 210 may receive, via the game controller 231, a first input triggering an activation of a multi-mode controller switching component 124 at the game console 210. Prior to receiving such input to activate the multi-mode controller switching component, the game controller 231 may control only the game console 210 with gaming inputs. As a result of such activation, a mode of the multi-mode controller switching component 124 may be changed so that the game controller provides gaming inputs and/or keyboard/mouse inputs, and either of such inputs may be provided to other devices, such as to the remote computer device 214 that may be executing a game or other application and casting the content to the game console 210. In some implementations, activation may be enabled by default, and does not require any extra action from the user.

The multi-mode controller switching component 124 may be an application program that permits control of the computing device (e.g., personal computer 214) in communication with the game console 210 via the game controller 231 according to the first controller mode 240 or the second controller mode 242. That is, the multi-mode controller switching component 124 may be configured to transmit one or more commands received from the game controller 231 according to a first controller mode 240 or a second controller mode 242 to a computing device (e.g., persona computer 214) in communication with the game console 210. In some implementations, the first input may be a sequential or simultaneous combination of key inputs, receiving a voice command, or detecting a gesture.

In some implementations, the first controller mode 240 may correspond to a gamepad mode for controlling the game console 210. For example, the first controller mode 240 may provide gaming inputs to the computing device, and such gaming inputs may be the same type of inputs the game controller 231 provides to the game console 210 when the multi-mode controller switching component 124 is not activated. In some implementations, the second controller mode 242 may correspond to keyboard/mouse mode for controlling the computing device (e.g., personal computer 214).

In some implementations, when the multi-mode controller switching component 124 is activated, the inputs from both the first controller mode 240 and the second controller mode 242 are provided to the computing device (e.g., personal computer 214). In some implementations, the first controller mode 240 may generate one or more gaming commands in response to at least one input received from the game controller 231. In some implementations, the second controller mode 242 may generate one or more key-board/mouse commands in response to at least one input received from the game controller 231.

At block 404, the method 400 may activate the multi-mode controller switching application to control a computing device in communication with the game console. For example, the game console 210 may execute multi-mode controller switching component 124 to activate a multi-mode controller switching application at the game console 210 to control the computing device (e.g., personal computer 214) according to at least one of the first controller mode 240 or the second controller mode 242. Further, for instance, activating the multi-mode controller switching component 124 may include identifying and/or selecting the computing device, or accepting an invite to receive a cast (or both). In some implementations, the multi-mode controller switching component may start or be activated in a default mode (e.g., either the first controller mode 240 or the second controller mode 242).

At block 406, the method 400 may configure the game console in accordance with a first controller mode. For example, the game console 210 may execute multi-mode controller switching component 124 to configure or enter the game console 210 in accordance with a first controller mode 240 (e.g., a default mode) such that inputs received from the game controller 231 are translated and transmitted to the computing device (e.g., personal computer 214) as gamepad commands.

At block 408, the method 400 may receive a control the computing device with the game controller in accordance with the first controller mode. For example, the game console 210 may execute multi-mode controller switching component 124 to control the computing device (e.g., personal computer 214) via the game controller 231 in accordance with the first controller mode 240.

In some implementations, controlling the computing device via the game controller 231 in the first controller mode 240 may include receiving, at the game console 210, a first selection of one or more buttons of the game controller 231 while operating in the first controller mode 240, determining at least one command associated with the first controller mode 240 based on receiving the first selection of the one or more buttons of the game controller, and transmitting, from the game console to the computing device, the at least one command while operating in the first controller mode and according to a first controller mode button-to-command mapping. For instance, the first controller mode button-to-command mapping may be a table mapping of buttons of the game controller 231 to one or more gamepad commands that may be transmitted to the personal computer 214.

In some implementations, blocks 410 through 416 of the method 400 may be performed while the game controller 231 is connected to the game console 210 and operating in a first controller mode 240.

At block 410, the method 400 may receive a second input representing a selection of a second controller mode different from the first controller mode. For example, as described herein, the game console 210 may receive, via the game controller 231, an input representing a selection of a second controller mode 242 different from the first controller mode 240.

In some implementations, receiving the input may include receiving a sequential or simultaneous combination of key inputs.

At block 412, the method 400 may switch from the first controller mode to the second controller mode. For example, the game console 210 may execute multi-mode controller switching component 124 to switch from the first controller mode 240 to the second controller mode 242 in response to receiving the second input.

In some implementations, switching from the first controller mode 240 to the second controller mode 242 may include determining whether the second input corresponds to a controller mode switching input, maintaining the first controller mode 240 based on a determination that the second input does not correspond to the controller mode switching input, and adjusting a mapping of one or more components of the game controller 231 to executable inputs associated with the second controller mode 242 based on a determination that the second input corresponds to the controller mode switching input. In some implementations, the controller switching input may correspond to a defined sequential or simultaneous combination of key inputs triggering the mapping adjustment.

In some implementations, the one or more components may include at least one button and a joystick. Adjusting the mapping may include mapping the joystick to a mouse cursor, and mapping the at least one button to a left or right mouse button.

At block 414, the method 400 may control a computing device in communication with the game console in accordance with the second controller mode. For example, the game console 210 may, via the game controller 231, control a computing device (e.g., personal computer 214) in communication with the game console 210 in accordance with the second controller mode 242.

In some implementations, controlling the computing device (e.g., personal computer 214) in accordance with the second controller mode 242 may include receiving, at the game console 210, a second selection of one or more buttons of the game controller while operating in the second controller mode 242, determining at least one command associated with the second controller mode 242 based on receiving the second selection of the one or more buttons of the game controller 231, and transmitting, from the game console 210 to the computing device, the at least one command while operating in the second controller mode 242 according to a second controller mode button-to-command mapping. For instance, the second controller mode button-to-command mapping may be a table mapping of buttons of the game controller 231 to one or more keyboard and/or mouse commands that may be transmitted to the personal computer 214.

In some implementations, operating in the first controller mode 240 may include operating a first application executing on the computing device (e.g., personal computer 214) and being cast to the game console 210 using the game controller 231 in a gamepad mode. In some implementations, controlling the computing device in accordance with the second controller mode 242 may further include controlling the first application or a second application executing on the computing device in a keyboard/mouse mode.

At block 416, the method 400 may receive, via the game controller, a third input representing a deactivation of the multi-mode controller application. For instance, when the multi-mode controller application is active, all commands associated with inputs received from the game controller 231 may be transmitted to the personal computer 214 during both the first controller mode 240 and the second controller mode 242, except for the multi-mode controller application deactivation command. Specifically, the third input may be a selection of single or combination buttons on the game controller 231 that triggers the deactivation of the multi-mode controller application.

Although not illustrated, the method 400 may further switch from the second controller mode 242 to the first controller mode 240. For example, the method 400 may receive, while in the second controller mode 242, another input representing a selection of the first controller mode 240. The method 400 may then determine that the input corresponds to a controller switching input to switch from the second controller mode 242 to a first controller mode 240. The method 400 may switch from the second controller mode 242 to the first controller mode 240 based on a determination that the input corresponds to the controller switching input.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. As described above, computer-readable media includes both computer storage media and communication media including any medium that facilitates transfer of a computer program from one place to another.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of communication at a game console including a game controller, comprising:
  receiving, via the game controller, a first input triggering an activation of a multi-mode controller switching application at the game console, wherein the multi-mode controller switching application is configured to transmit one or more commands received from the game controller according to a first controller mode or a second controller mode to a computing device in communication with the game console; and
  while the multi-mode controller switching application is active and the game controller is operating in the first controller mode:
    receiving, via the game controller, a second input representing a selection of the second controller mode different from the first controller mode;
    switching from the first controller mode to the second controller mode in response to receiving the second input; and
    transmitting a command from the game console to the computing device in accordance with the second controller mode.

2. The method of claim 1, wherein the first controller mode generates one or more gaming commands in response to at least one input received from the game controller.

3. The method of claim 1, wherein the second controller mode generates one or more keyboard/mouse commands in response to at least one input received from the game controller.

4. The method of claim 1, further comprising:
  activating the multi-mode controller switching application at the game console to control the computing device according to at least one of the first controller mode or the second controller mode; and controlling the computing device with the game controller in accordance with the first controller mode.

5. The method of claim 4, wherein operating the game controller in accordance with the first controller mode includes:

receiving, at the game console, a first selection of one or more buttons of the game controller while operating in the first controller mode;

determining at least one command associated with the first controller mode based on receiving the first selection of the one or more buttons of the game controller; and transmitting, from the game console to the computing device, the at least one command while operating in the first controller mode.

6. The method of claim 1, wherein controlling the computing device in accordance with the second controller mode includes:

receiving, at the game console, a second selection of one or more buttons of the game controller while operating in the second controller mode;

determining at least one command associated with the second controller mode based on receiving the second selection of the one or more buttons of the game controller; and transmitting, from the game console to the computing device, the at least one command while operating in the second controller mode.

7. The method of claim 1, wherein receiving the second input includes receiving a sequential or simultaneous combination of key inputs, receiving a voice command, or detecting a gesture.

8. The method of claim 1, wherein switching from the first controller mode to the second controller mode includes:

determining whether the second input corresponds to a controller mode switching input;

maintaining the first controller mode based on a first determination that the second input does not correspond to the controller mode switching input; and adjusting a mapping of one or more components of the game controller to executable inputs associated with the second controller mode based on a second determination that the second input corresponds to the controller mode switching input.

9. The method of claim 8, wherein the one or more components include at least one button and a joystick, and wherein adjusting the mapping includes:

mapping the joystick to a mouse cursor, and mapping the at least one button to a left or right mouse button.

10. The method of claim 8, wherein the controller mode switching input corresponds to a defined sequential or simultaneous combination of key inputs triggering the adjusting of the mapping.

11. The method of claim 1, wherein the computing device is in communication with the game console via an interface connection.

12. The method of claim 1, wherein the computing device is a personal computer.

13. The method of claim 1, wherein operating in the first controller mode includes operating a first application executing on the computing device and being cast to the game console using the game controller in a gamepad mode; and wherein controlling the computing device in accordance with the second controller mode further comprises controlling the first application or a second application executing on the computing device in a keyboard/mouse mode.

14. The method of claim 1, further comprising:

receiving, via the game controller, a third input triggering a deactivation of the multi-mode controller switching application at the game console; and deactivating the multi-mode controller switching application at the game console.

15. A game console, comprising:

a memory configured to store one or more executable instructions;

a game controller configured to transmit one or more received inputs; and at least one processor in communication with the memory and the game controller, wherein the at least one processor is configured to:

receive, via the game controller, a first input triggering an activation of a multi-mode controller switching application at the game console, wherein the multi-mode controller switching application is configured to transmit one or more commands received from the game controller according to a first controller mode or a second controller mode to a computing device in communication with the game console; and while the multi-mode controller switching application is active and the game controller is operating in the first controller mode:

receive, via the game controller, a second input representing a selection of the second controller mode different from the first controller mode;

switch from the first controller mode to the second controller mode in response to receiving the second input; and transmitting a command from the game console to the computing device in accordance with the second controller mode.

16. The game console of claim 15, wherein the first controller mode generates one or more gaming commands in response to at least one input received from the game controller.

17. The game console of claim 15, wherein the second controller mode generates one or more keyboard/mouse commands in response to at least one input received from the game controller.

18. The game console of claim 15, wherein the at least one processor is further configured to:

activate the multi-mode controller switching application at the game console to control the computing device according to at least one of the first controller mode or the second controller mode; and control the computing device with the game controller in accordance with the first controller mode.

19. The game console of claim 18, wherein to operate the game controller in accordance with the first controller mode, the at least one processor is further configured to:

receive, at the game console, a first selection of one or more buttons of the game controller while operating in the first controller mode;

determine at least one command associated with the first controller mode based on receiving the first selection of the one or more buttons of the game controller; and transmit, from the game console to the computing device, the at least one command while operating in the first controller mode.

20. A computer-readable medium storing instructions executable by a game console including a game controller, comprising at least one instruction for:
- receiving, via the game controller, a first input triggering an activation of a multi-mode controller switching application at the game console, wherein the multi-mode controller switching application is configured to transmit one or more commands received from the game controller according to a first controller mode or a second controller mode to a computing device in communication with the game console; and
- while the multi-mode controller switching application is active and the game controller is operating in the first controller mode:
  - receiving, via the game controller, a second input representing a selection of the second controller mode different from the first controller mode;
  - switching from the first controller mode to the second controller mode in response to receiving the second input; and
  - transmitting a command from the game console to the computing device in accordance with the second controller mode.

* * * * *